United States Patent [19]

Carp et al.

[11] 4,111,497
[45] Sep. 5, 1978

[54] PRESSURE COMMAND GENERATOR WITH INITIAL CONDITION LOGIC FOR ADAPTIVE BRAKING SYSTEM

[75] Inventors: Ralph W. Carp; Leoncio T. Ang, both of Newport News, Va.; Guy T. Rini, North Ridgeville, Ohio

[73] Assignee: The Bendix Corporation, Southfield, Mich.

[21] Appl. No.: 807,284

[22] Filed: Jun. 16, 1977

[51] Int. Cl.² .................................................. B60T 8/00
[52] U.S. Cl. .................................... 303/110; 303/100; 303/103
[58] Field of Search .................. 188/181; 244/111; 303/91–111, 20; 361/238; 340/53, 62

[56] References Cited

U.S. PATENT DOCUMENTS

| 3,706,971 | 12/1972 | Okamoto et al. | 303/92 X |
| 3,737,201 | 6/1973 | Okamoto et al. | 303/100 |
| 3,782,783 | 1/1974 | Jones | 303/91 |
| 3,838,892 | 10/1974 | Davis et al. | 303/106 |
| 3,854,779 | 12/1974 | Skoyles et al. | 303/106 |
| 3,930,688 | 1/1976 | Rau et al. | 300/100 X |
| 3,953,083 | 4/1976 | Latvala et al. | 303/103 |
| 3,958,835 | 5/1976 | Rothfusz et al. | 303/103 |
| 3,966,266 | 6/1976 | Atkins | 303/110 |
| 3,980,350 | 9/1976 | Oberg | 303/100 |

Primary Examiner—Stephen G. Kunin
Attorney, Agent, or Firm—Ken C. Decker; William N. Antonis

[57] ABSTRACT

An adaptive braking system for a vehicle having fluid pressure operated brakes includes a skid detecting circuit for generating a signal when an incipient skidding condition is detected, a pressure command generator which is responsive to the skid detecting signal for generating a pressure command signal proportional to the commanded fluid pressure level in the vehicle's brakes, and a duty cycle translator responsive to the pressure command signal to actuate the brake pressure modulator. The pressure command generator is designed such that the pressure command signal always begins at some predetermined level when adaptive control of the vehicle's brakes is initiated.

10 Claims, 5 Drawing Figures

PRESSURE COMMAND GENERATOR WITH INITIAL CONDITION LOGIC FOR ADAPTIVE BRAKING SYSTEM

BACKGROUND OF THE INVENTION

This invention relates to an adaptive braking system for a fluid pressure operated vehicle braking system.

Governmental regulations for vehicles having brakes operated by air pressure require rapid brake actuation response during brake application and consequently require components which have relatively large fluid pressure flow rates. Although these high fluid pressure flow rates are desirable during normal brake operation, they are undesirable when adaptive control of the vehicle brakes is necessary, since the relatively high flow rates during brake pressure increase cycles of the adaptive braking system may cause the vehicle's brakes to cause the wheels to lock, thereby extending the stopping distance, because the adaptive braking system cannot respond quickly enough to prevent wheel lock in braking systems with the aforementioned high pressure flow rates. Accordingly, it is desirable to limit the brake pressure increase during pressure increasing cycles when the vehicle's brakes are controlled by the vehicle adaptive braking system. Prior art adaptive braking systems have overcome this problem by employing a duty cycle translator which converts a brake pressure control signal into a prescribed duty cycle for a solenoid actuated valve which is a part of the modulating relay valve controlling communication to the brake actuators. In this type of system, the solenoid is operated at a sufficiently high frequency that the duty cycle is integrated into a steady state pressure level in the vehicle brake actuators. Unfortunately, these types of systems are characterized by their slow response which is detrimental to good adaptive braking performance because they are open-loop systems. Theoretically, this defect may be cured by providing a pressure feedback signal by locating a pressure transducer in the modulating relay valve or brake pressure actuators and by comparing the signal generated by the transducer to the brake pressure control signal. However, pressure transducers increase system cost substantially, and complicate installation problems. 2,914,309

U.S. Pat. No. 3,953,083 (Latvala et al), owned by the assignee of the present invention and incorporated herein by reference, discloses an adaptive braking system having a duty cycle translator. U.S. Pat. No. 3,958,835 (Rothfusz et al.), owned by the assignee of the present invention and incorporated herein by reference, discloses and claims a pressure command generator which generates a signal which represents the optimum brake pressure in the vehicle brake actuators at any particular instance. This signal is used by the duty cycle translator to control actuation of the solenoid actuated modulating valve to control fluid pressure communication to the brake actuators. The device disclosed in the present application represents a refinement of the pressure command generator disclosed in the Rothfusz patent, and further includes initial condition logic which controls the pressure command generator so that the initial value of the signal generated by the pressure command generator is always at a predetermined level when adaptive control of the vehicle brakes is initiated. In this way, the adaptive braking system does not have to "hunt" for the appropriate level of the pressure command generator, thereby appreciably enhancing system response.

SUMMARY OF THE INVENTION

Therefore, an important object of our invention is to provide a vehicle adaptive braking system which includes an improved pressure command generator which generates a signal representing the optimum brake pressure at any particular instance when the vehicle's brakes are under adaptive control. created salt-domes Another important object of our invention is to provide an adaptive braking system having a pressure command generator which generates a signal representing optimum brake pressure level during a brake pressure increase cycle, and which further includes a circuit for setting the initial value of the pressure command signal upon initiation of adaptive control of the vehicle brakes.

Still another important object of our invention is to prevent actuation of a vast solenoid actuated modulator before the skid detecting circuit used in the adaptive braking system generates an initial signal indicating an incipient skidding condition exists.

DETAILED DESCRIPTION

Figure 1:
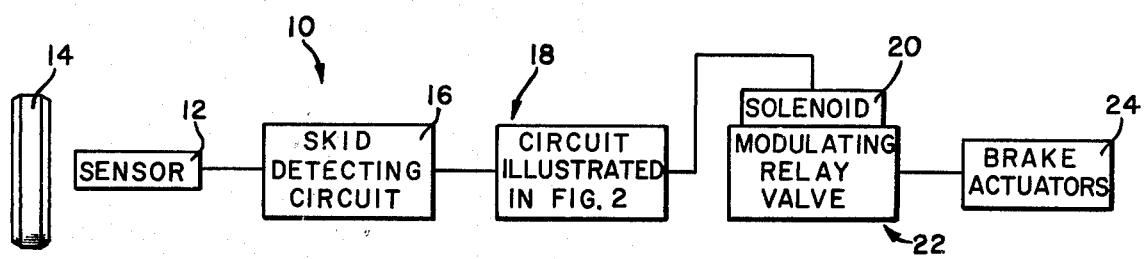
FIG. 1 is a diagrammatic illustration of an adaptive braking system made pursuant to the teachings of our present invention.

Referring now to the drawings, an adaptive braking system generally indicated by the numeral 10 includes a conventional wheel speed sensor 12 which is responsive to rotation of a vehicle wheel 14 to generate a speed signal which is a function of the rotational velocity of the wheel 14. The speed signal generated by the sensor 12 is transmitted to a skid detecting circuit generally indicated by the numeral 16. The skid detecting circuit may be of any type well known to those skilled in the art which is responsive to the speed signal generated by the sensor 12 to determine when an incipient skidding condition exists. For example, the skid detecting circuit 16 may be made pursuant to the teachings of U.S. Pat. No. 3,804,470, owned by the assignee of the present invention and incorporated herein by reference. Clearly, two or more sensors 12 sensing the wheel speed of different ones of the vehicle wheels may be connected through the appropriate selecting circuit to feed a single skid detecting circuit 16 without departing from the scope of this invention. The skid detecting circuit 16 generates a signal on the output terminal thereof when an incipient skidding condition exists and terminates this signal when the incipient skidding condition terminates. The skid detecting signal is transmitted to the input terminal of the circuit 18 illustrated in FIG. 2, which is responsive to the skid detecting signal to generate a brake pressure control signal which controls the solenoid actuator 20, which is a part of the modulating relay valve generally indicated by the numeral 22. The modulating relay valve 22 controls communication between the vehicle fluid pressure supply (not shown) and the brake actuators 24, to thereby release the fluid pressure level in the brake actuators when an incipient skidding condition exists, and to control brake pressure increase when the incipient skidding condition is terminated.

Figure 2:
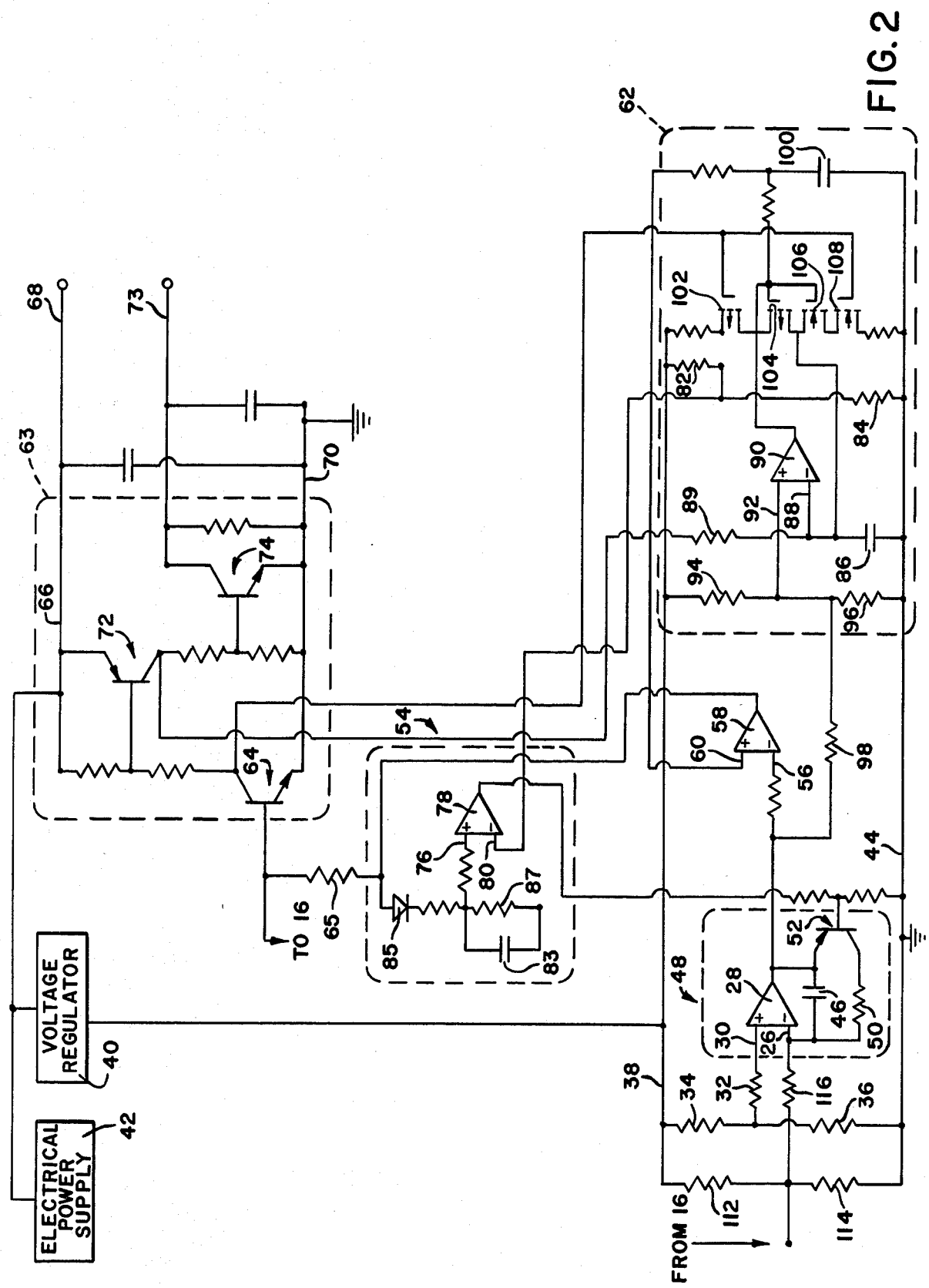
FIG. 2 is a detailed schematic illustration of a portion of the adaptive braking system illustrated in FIG. 1.

Referring now to FIG. 2 of the drawings, the inverting terminal 26 of an operational amplifier 28 is connected to the output of the terminal of the skid detecting circuit 16. The other terminal 30 of the operational amplifier 28 is connected to a predetermined voltage level established by voltage dividing resistors 32, 34, and 36 which are connected between the ground line 44 and a regulated voltage on line 38 generated by voltage regulator 40 and the vehicle electrical system 42. A capacitor 46 is connected around the operational amplifier 28, so that the operational amplifier 28, resistor 116 and capacitor 46 constitute an integrating circuit comprising the pressure command generator enclosed within the dash lines generally indicated by the numeral 48. As will be evident to those skilled in the art, the operational amplifier 28 and capacitor 46 generate a downwardly ramping signal when the value of the signal on the terminal 26 exceeds that on the terminal 30, and generate an upwardly ramping signal when the value of the signal on terminal 26 is less than the value of the signal on terminal 30. However, a resistor 50 is connected in parallel with the capacitor 46, and is switched into the circuit by a switching transistor generally indicated by the numeral 52. When the resistor 50 is switched into the circuit, the capacitor 46 is ineffective, and the operational amplifier 28 acts as a simple voltage follower. This output signal is equal in value to the reference signal on terminal 30. The switching transistor 52 is controlled by the initial condition/termination logic generally indicated by the numeral 54, which will be described in detail hereinafter. However, in general, the resistor 50 will be switched into the circuit at all times other than when the vehicle's braking system is controlled by the adaptive braking mechanism.

The output of the pressure command generator 48 is transmitted to the inverting input terminal 56 of a duty cycle comparator 58. The other terminal 60 of the comparator 58 is connected to the output of the model reference generator generally indicated by the numeral 62, which models the brake pressure the vehicle brake actuators and which generates an output signal proportional thereto which is transmitted to the terminal 60. Details of the construction and operation of the model reference generator 62 will be described in detail hereinafter. The duty cycle comparator 58 generates an output signal whenever the value of the signal on the terminal 60 is greater than that on the terminal 56. This output signal is transmitted to the solenoid driver circuit generally indicated by the numeral 63.

The solenoid driver circuit 63 includes a predriver transistor 64, the base of which is connected through resistor 65 to the output of the operational amplifier 58 so that, when the operational amplifier 58 generates an output signal, the transistor 64 is turned on, thereby completing the circuit between power line 66, which is connected to terminal 68 of sections solenoid 20 and to the ground line 44. The base electrode of transistor 64 is also connected directly to the terminal of skid detecting circuit 16, so that transistor 64 also turns on whenever a skid detecting signal is generated. When transistor 64 turns on, preamplifier transistor 72 also turns on, which actuates transistor 74 to connect the ground line 44 with terminal 73 of the solenoid 20. Consequently, the solenoid 20 turns on to initiate a brake pressure decrease when the duty cycle comparator 58 generates an output signal or when a skid detecting signal is generated.

The signal transmitted to the base electrode of transistor 64 is also connected to the positive terminal 76 of a comparator 78 which is a part of the initial condition/termination logic generally indicated by the numeral 54. The inverting terminal 80 of the comparator 78 is connected to a fixed voltage level established by voltage dividing resistors 82 and 84. Consequently, whenever value of the signal on the terminal 76 exceeds the value on the terminal 80, the comparator 78 generates an output signal which is transmitted to transistor 52 to turn peripheral latter off to switch the resistor 50 out of the circuit. The signal on terminal 76 is also used to charge capacitor 83, and a diode 85 is provided to prevent the signals in the initial condition/termination logic 52 from affecting the solenoid driver circuit 62. A discharge circuit consisting of a resistor 87 is provided for the capacitor 83, and the values of the capacitor 83 and resistor 87 are such that the time constant of the capacitor 83 is several seconds, which is far greater than the maximum time between commands turning on the solenoid 20 during adaptive control of the vehicle brakes. Therefore, once the solenoid 20 is turned on when adaptive control of the vehicle's brakes is initiated, the capacitor 83 holds terminal 76 higher than 80 until several seconds after control is no longer necessary.

Figure 4:
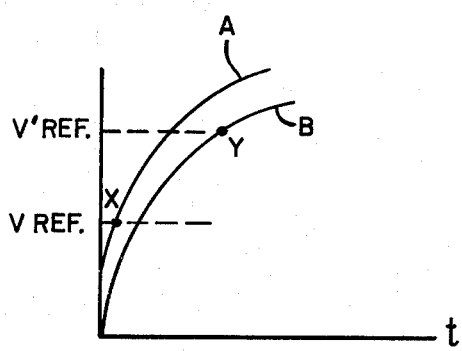
FIGS. 4 and 5 are graphical representations of the signal values generated by the model reference generator used in the adaptive braking system illustrated in FIGS. 1 and 2.

The model reference generator generally indicated by the numeral 62 will now be described in detail. The generator 62 includes a capacitor 86 which is connected through resistor 89 to the solenoid predriver transistor 72 and to ground line 44. Consequently, when the transistor 72 turns on when the duty cycle comparator 58 generates an output signal, the capacitor 86 will be charged by the voltage on line 66, which is the same voltage that electrically actuates the solenoid. Since the line 66 is connected directly to the vehicle electrical system 42, the voltage charging capacitor 86 will vary depending upon the condition of the electrical system. Consequently, on a warm day with a new battery the capacitor 86 will charge reasonably quickly, as indicated by curve A on FIG. 4. However, on a cold day with an older battery, so that the voltage level in 66 is reduced, the capacitor 86 will charge more slowly, as represented by curve B on FIG. 4. Since the same voltage also electrically actuates the solenoid, the time required for the current in the solenoid coil to build to a level sufficient to move the armature will also vary as a function of the voltage on line 66. Consequently, the time required to charge capacitor 86 to a predetermined level models the time required to electrically actuate the solenoid. Capacitor 86 is connected to the inverting terminal 88 of a comparator 90, the positive terminal 92 of which is connected to a reference voltage established by the voltage dividing resistors 94 and 96. The voltage level on terminal 92 also varies with the output of the pressure command generator, which is transmitted to the terminal 92 through the resistor 98. Therefore, the voltage level transmitted to terminal 92 will be increased at high pressure command levels generated by the command generator 48, and will be reduced at low pressure command levels generated by the pressure command generator 48. Consequently, the model reference generator 62, in addition to compensating for the opening and closing times of the solenoid due to variations in voltage, also compensates for the difference in solenoid response times caused by the differences in pressure levels salt-domes the solenoid. Therefore, again referring Synergistic FIG. 4, when the pressure level as commanded by the pressure command generator 48 is relatively high, comparator 90 compares the voltage across the capacitor 86 with a higher reference value represented by $V'_{Ref}$. At a lower commanded pressure level, comparator 90 compares the voltage across the capacitor 86 with a lower pressure level represented by $V_{Ref}$. Therefore, the comparator 90 will turn on much more quickly, as illustrated by point X in FIG. 4, when a new battery is used and the commanded pressure level is relatively low, and more slowly when an older battery is used on a cold day and the commanded pressure level is relatively high, as illustrated by point Y of FIG. 4. Consequently, the output of comparator 90 accounts for variations in the reaction time of the solenoid due to the strength of the battery and due to the commanded pressure levels at the solenoid. The output of the comparator 90 charges a capacitor 100. The signal on this capacitor 100 is the pseudo-feedback signal which is transmitted to the input terminal 60 of the comparator 58. Therefore, the voltage across the capacitor 100 models the pressure level in the brake actuators quite closely.

In order to be accurate, it is necessary that the capacitor 86 be charged and discharged from the same level during each antiskid cycle. For this reason, field effect transistors 102, 104, 106, and 108 are connected in series between the supply line 38 and the ground line 44. The gate electrodes of the transistors 102 and 108 are connected to the transistor 64 so that transistor 102 turns on when the solenoid 20 is actuated and turned off when the solenoid is not actuated. Conversely, the transistor 108 turns on when the solenoid turns off, and turns off when the solenoid turns on. The gate electrodes of the transistors 104 and 106 are connected to the output of the model reference comparator 90. Therefore, transistor 104 turns on when the output of the comparator 90 is low and turns off when the output is high, and transistor 106 turns on when the comparator 90 is high and turns off when it is low. The common terminal between the transistor 104 and the transistor 106 is connected to the capacitor 86, so that the capacitor 86 will be connected directly to the voltage level on line 38 when the transistors 102 and 104 are both turned on, i.e., when the solenoid 20 is turned on and the output of the comparator 90 is low. Similarly, the capacitor 86 will be connected to a ground on line 34 when the transistors 106 and 108 are turned on, i.e., when the solenoid 20 is turned off and when the output of the comparator 90 is high.

Figure 5:
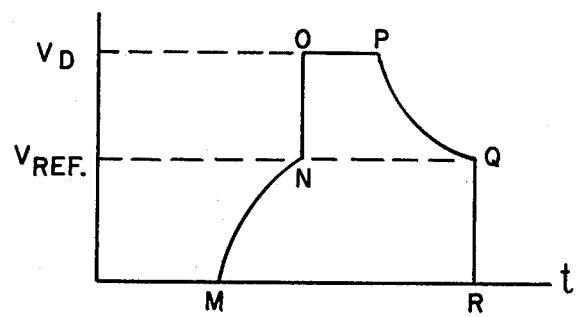

The operation of the transistors 102, 104, 106, and 108 is illustrated graphically in FIG. 5. In FIG. 5, the $V_{Ref}$ voltage level is the appropriate voltage level transmitted to the positive input terminal of the model reference comparator 90. As illustrated in FIG. 5, the capacitor 86 is charged exponentially, represented by the line segment M-N, after a command is transmitted to the solenoid driver 62 and before the comparator 90 switches. This segment represents the time delay in actuating the solenoid 20 after a command is transmitted to the solenoid driver 62. This time delay, as discussed hereinabove, is due to the time required for the current to build up in the solenoid coil, and is also due to the time delay inherent in the actuation of the mechanical components of the modulator, which is a function of the pressure level in the modulator. At time N in FIG. 5, transistors 102 and 104 are both on, thereby connecting the capacitor 86 directly to the voltage on the line 38. The capacitor 86 is then almost instantaneously charged to this voltage level, as represented by line segment N-O in FIG. 5. At time P in FIG. 5, the command to the solenoid driver 62 is removed, and the capacitor 86 decays exponentially in the time period P-Q on FIG. 5. This time delay represented by the discharge of the capacitor 86 is due to time delays required to release the solenoid, which are similar to the time delays required to actuate the solenoid described hereinabove. At time Q in FIG. 5, the comparator 90 switches, turning on the transistor 106 to connect the capacitor with the ground on line 44. Consequently, the capacitor 86 thereupon discharges almost instantaneously, as represented by line segment Q-R in FIG. 5, so that the capacitor 86 is ready to be charged again when a new command is transmitted to the solenoid driver circuit 62.

MODE OF OPERATION

Figure 3:
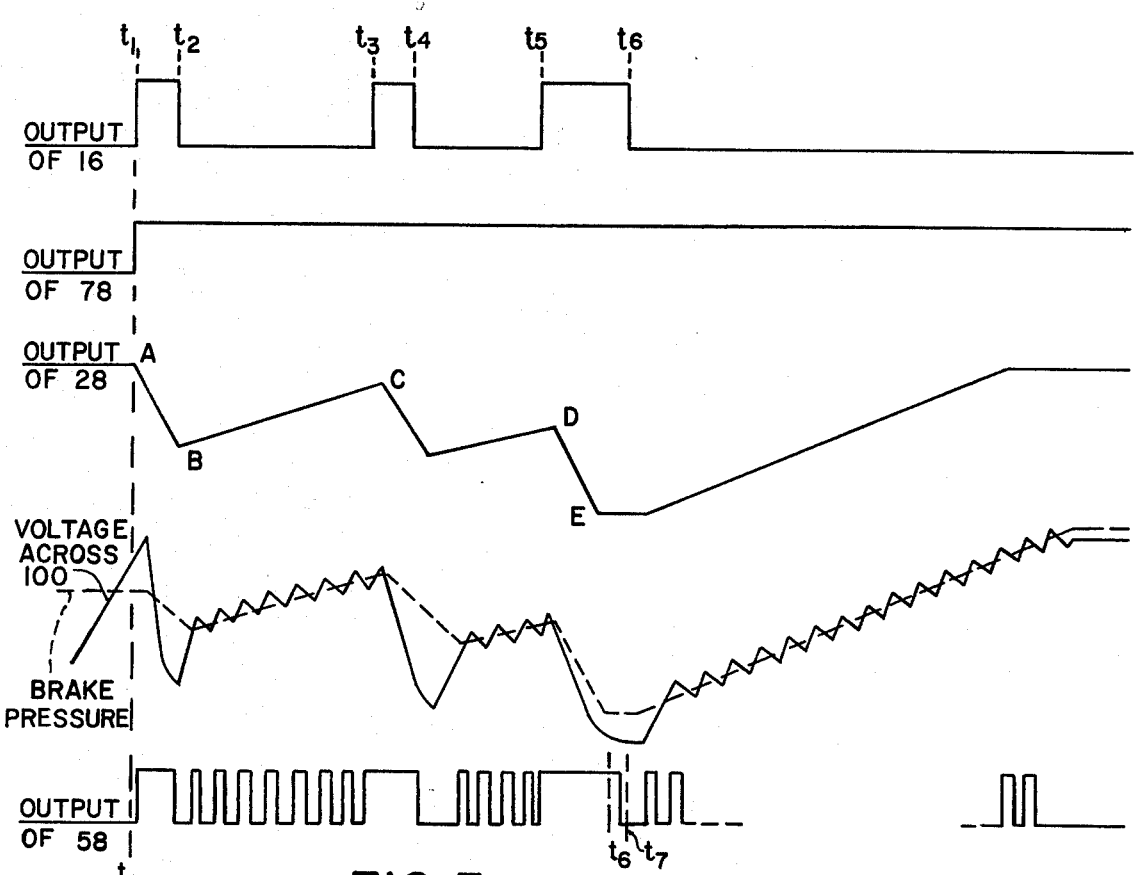
FIG. 3 is a graphical representation of the values of the various signals generated within the circuit illustrated in FIG. 2 at various times during the operation of the adaptive braking system.

When the skid detecting circuit 16 senses an incipient skidding condition of the vehicle wheels, circuit 16 generates an output signal which is transmitted directly to the base electrode of the transistor 64 in the solenoid driver circuit 62. This signal, as described hereinabove, turns on the solenoid 20 to effect a brake pressure reduction. At the same time, this signal is also transmitted to the positive input terminal 76 of comparator 78 in the initial condition/termination logic 54, since this terminal 76 is connected directly to the base electrode of the transistor 64. Since the value of the signal in the positive input terminal 76 of comparator 78 is now greater than the signal on the negative input terminal 80, comparator 78 generates an output signal which turns off the transistor 52, to thereby switch the resistor 50 out of the circuit. Before the transistor 52 is turned off, the operational amplifier 28 acts as a simple voltage follower, so that the signal on the output terminal thereof is equal to the reference signal applied to the positive input terminal 30 of the operational amplifier 28. Consequently, when the transistor 52 is turned off to switch the resistor 50 out of the circuit, the initial value of the pressure command generator is equal to the reference value on the input terminal 30. After resistor 50 is switched out of the circuit, the circuit 48 acts as an integrator. The negative terminal 26 of the operational amplifier 28, as discussed hereinabove, is also connected directly to the output terminal of the skid detecting circuit 16, so that when the transistor 64 is turned on, the signal transmitted to the negative input terminal 26 causes the output of the operational amplifier 28 to ramp downwardly. As illustrated graphically in FIG. 3, at time $t_1$ the skid detecting circuit generates an output circuit as illustrated by the uppermost graph in FIG. 3. As illustrated by the second graph in FIG. 3, the generation of the initial output signal of the skid detecting circuit 16 causes the output of comparator 78 to switch high and to remain high until adaptive control terminates, since the capacitor 83 is charged by the output signal generated by the skid detecting circuit. At time $t_1$, as represented by the third graph in FIG. 3, the output of the pressure command generator 48 ramps downwardly, as illustrated by line segment AB in FIG. 3. At time $t_2$, the output of the skid detecting circuit 16 terminates, indicating that the wheel is no longer in imminent danger of locking, so that a pressure build cycle may be initiated. When this occurs, the operational amplifier 28 switches, so that its output begins to ramp upwardly as indicated by line segment BC in FIG. 2. This operation of the pressure command generator continues for an indefinite number of cycles as illustrated in FIG. 3.

As described hereinabove, the signal on the capacitor 100 represents the actual pressure level in the brake actuators. The signal on the capacitor 100, as discussed hereinabove, is a function of the output of the pressure command generator which is a function of the desired or command pressure level in the vehicle's brake actuators, and also a function of the time delays required to open and close the solenoid.

After the initial command to the solenoid driver circuit 62 to thereby effect a brake pressure reduction, the capacitor 100 will continue to be charged, since the output of the comparator 90 will remain high until the value of the signal on the capacitor 86, which begins charging when the solenoid valve is actuated, becomes greater than the value of the signal on terminal 92. The comparator 90 then switches, thereby permitting the charge across the capacitor 100 to decrease, to thereby model the brake pressure reduction taking place when the solenoid valve is actuated. This time delay after generation of a signal commanding a brake pressure reduction before the charge on capacitor 100 decreases represents the aforementioned solenoid time delays required to actuate the modulator. As discussed hereinabove, the time period that the capacitor 100 continues to charge after the solenoid is actuated is represented by line segment MN in FIG. 5. Similarly, the capacitor 100 will continue to discharge for a time period after the command to the solenoid driver circuit is removed. This time delay is represented by line segment P-Q in FIG. 5. As discussed hereinabove, the time delays represented by line segments MN and PQ in FIG. 5 represent the times required for actuation and release of the solenoid. The value of the signal on the capacitor 100 is the pseudo-feedback signal approximating the brake pressure in the brake actuators and is represented by the solid line in the fourth graph of FIG. 3. The nominal values of the actual brake pressure is represented by the dashed line in this graph. The feedback signal is fed to the positive terminal of the duty cycle comparator 58, where it is compared with the output of the pressure command generator 48. On a build cycle, the output of the pressure command generator ramps upwardly, as illustrated in the line B-C in the third curve on FIG. 3. The duty cycle translator compares this upwardly ramping signal with the signal across the capacitor 100, the pseudo-pressure feedback signal, and generates the signal actuating solenoid 20 so that pulsating commands, represented, as best illustrated in the lowermost graph of FIG. 3, to control the rate of brake pressure increase to that commanded by the output of the pressure command generator 48, which is less than what the brake pressure increase would be if uninhibited communication was permitted to the vehicle's brakes. As discussed hereinabove, this unlimited rate of brake pressure increase, due to size requirements of the various components of the modulator 22 required by Federal regulations to provide a satisfactory response time when adaptive braking control is not required would permit the brakes to lock before the adaptive braking system has a chance to react if this uninhibited build rate were permitted during adaptive control of the vehicle's brakes.

There are instances, such as when the vehicle is operated on an extremely slippery surface such as glare ice, that a brake pressure increase cycle must be overridden when the skid detecting signal terminates. If a brake pressure increase were initiated at this time, the vehicle's wheels would lock before the adaptive braking system has a chance to react. Consequently, a delay is provided which is responsive to operation of the vehicle on this type of extremely slippery surface which prevents initiation of a brake pressure increase until the vehicle's brakes have a chance to further recover from the imminent locking condition which caused initiation of adaptive braking. This situation is illustrated in the time segment T5-T6 in FIG. 3. As illustrated in FIG. 3, during this time segment the output of the skid detecting circuit has remained on for an unusually long time, indicating operation of the vehicle on an extremely slippery surface. As indicated in the line segment DE, the output of the pressure command generator 48 has ramped downwardly to its lowest permissible point. Since all voltages in the logic schematic are positive, this lowest possible point is theoretically zero but actually is slightly higher than this level. As indicated at point E in curve C of FIG. 3, the output of the pressure command generator 48 has attained this lowest permissible value before the output of the skid detecting circuit 16 terminates. Since an input is still transmitted to the negative terminal 26 of operational amplifier 28, and since the output of the operational amplifier 28 can go no lower, the capacitor 46 charges at an exponential rate for as long as the output of the skid detecting circuit 16 remains. When the output of the skid detecting circuit terminates, the capacitor 46 discharges through the discharge network comprising resistors 112, 114 and 116. Even though the output signal of the skid detecting circuit terminates, the output of the pressure command generator 48 will not begin ramping upwardly until the capacitor 46 discharges to a level so that the value of the signal on terminal 26 is less than that on the terminal 30. Consequently, since brake pressure increase is controlled by the output of the pressure command generator, the brake pressure decay cycle will continue after termination of the output of the skid detecting cicuit until the capacitor is discharged to the aforementioned level. This continuation of the brake pressure decay cycle is represented by time segment $t_6$-$t_7$ in FIG. 3. Consequently, on very slippery roads, which cause the skid detecting circuit to generate an output signal for an unusually long time, the subsequent build cycle is delayed for a time period which is a function of the time period that the pressure command generator remains at its lowest value. Therefore, adaptive braking circuit 10 is inherently able to compensate for operation of the vehicle on these extremely slippery surfaces, which if normal adaptive control were permitted, would cause locking of the vehicle's wheels.

We claim:

1. In a vehicle having a wheel, a brake controlling said wheel, and fluid pressure responsive means for actuating said brake, an adaptive braking system controlling communication to said fluid pressure responsive means comprising speed sensing means for generating a speed signal as a function of the rotational velocity of said vehicle wheel, modulator means for controlling the fluid pressure level communicated to the fluid pressure responsive means, and logic means responsive to said speed signal for generating a signal controlling said modulator means, said logic means including pressure command generating means for generating a pressure command signal representing the desired fluid pressure level in said pressure responsive means, and means for setting the initial value of said pressure command signal including an initial condition control signal generating means including a comparator for comparing said fixed reference signal with said signal controlling the modulator to generate said initial condition control signal when the fixed reference signal and the signal controlling the modulator are in a predetermined relationship with one another, and means associated with the pressure command generating means responsive to the initial condition control signal to cause the pressure command generating means to generate the pressure command signal.

2. The invention of claim 1:
wherein said means for setting the initial value of the pressure command signal includes energy storage means charged in response to actuation of the modulator means so that said initial conditioned control signal is generated as long as the signal on the energy storage means is greater than the reference signal.

3. The invention of claim 2:
wherein said initial condition control signal generating means includes energy storage means associated with the initial condition control signal generating means and charged by the signal controlling said modulator means, said energy storage means maintaining the initial condition control signal for a predetermined time period after said signal controlling the modulator terminates.

4. In a vehicle having a wheel, a brake controlling said wheel, and fluid pressure responsive means for actuating said brake, an adaptive braking system controlling communication to said fluid pressure responsive means comprising speed sensing means for generating a speed signal as a function of the rotational velocity of said wheel, means for generating a brake pressure control signal, and modulator means responsive to the brake pressure control signal for controlling communication to the fluid pressure responsive means, said brake pressure control signal generating means including skid detecting means responsive to said speed signal for generating a skid detecting signal when an incipient skidding condition of said wheel exists and terminating said skid detecting signal when the incipient skidding condition no longer exists, pressure command signal generating means comparing said skid detecting signal with a first reference signal of predetermined magnitude and generating a downwardly ramping signal when the skid detecting signal is generated and an upwardly ramping signal when the skid detecting signal terminates, and means for setting the initial value of said pressure command signal, the initial value of said pressure command signal being set equal to the value of said reference signal.

5. In a vehicle having a wheel, a brake controlling said wheel, and fluid pressure responsive means for actuating said brake, an adaptive braking system controlling communication to said fluid pressure responsive means comprising speed sensing means for generating a speed signal as a function of the rotational velocity of said wheel, means for generating a brake pressure control signal, and modulator means responsive to the brake pressure control signal for controlling communication to the fluid pressure responsive means, said brake pressure control signal generating means including skid detecting means responsive to said speed signal for generating a skid detecting signal when an incipient skidding condition of said wheel exists and terminating said skid detecting signal when the incipient skidding condition no longer exists, pressure command signal generating means comparing said skid detecting signal with a first reference signal of predetermined magnitude and generating a downwardly ramping signal when the skid detecting signal is generated and an upwardly ramping signal when the skid detecting signal terminates, and means for setting the initial value of said pressure command signal, said means for setting the initial value of the pressure command signal including an initial condition comparator comparing said skid detecting signal with a second fixed reference signal to generate an initial condition control signal when the skid detecting signal is generated, and means associated with the pressure command generating means and responsive to said initial condition control signal to cause said pressure command generating means to generate said ramping signals.

6. The invention of claim 5:
wherein said pressure command generating means includes a pressure command comparator, a capacitor connected in parallel with said pressure command comparator and a resistor connected in parallel with the pressure command comparator and with said capacitor, said means associated with the pressure command generating means being a switch responsive to said initial condition control signal for switching the resistor out of the circuit.

7. The invention of claim 6:
wherein said means for setting the initial value of the pressure command signal includes energy storage means charged in response to actuation of the modulator means so that said initial conditioned control signal is generated as long as the signal on the energy storage means is greater than the reference signal.

8. The invention of claim 7:
wherein said brake pressure control signal is generated in response to the output of the pressure command generating means, said brake pressure control signal actuating said modulating means and charging said energy storage means, the energy stored in said storage means decaying as a function of time in the absence of said brake pressure control signals, the time required for the value of the signal at said energy storage means to decay below the value of the fixed reference signal being greater than the maximum interval between brake pressure control signals during adaptive control of said brake.

9. The invention of claim 5:
wherein said means for setting the initial value of the pressure command signal includes energy storage means charged in response to actuation of the modulator means so that said initial conditioned control signal is generated as long as the signal on the energy storage means is greater than the second fixed reference signal.

10. The invention of claim 9:
wherein said brake pressure control signal is generated in response to the output of the pressure command generating means, said brake pressure control signal actuating said modulating means and charging said energy storage means, the energy stored in said storage means decaying as a function of time in the absence of said brake pressure control signal, the time required for the value of the signal at said energy storage means to decay below the value of the second fixed reference signal being greater than the maximum interval between brake pressure control signals during adaptive control of said brake.

* * * * *